United States Patent [19]

Nishimiya

[11] Patent Number: 5,025,330
[45] Date of Patent: Jun. 18, 1991

[54] HEAD POSITIONING CONTROL SYSTEM AND METHOD FOR A MEMORY DEVICE USING EVEN AND ODD TRACK CROSS PULSES

[75] Inventor: Takeshi Nishimiya, Cupertino, Calif.
[73] Assignee: Fujitsu Limited, Kawasaki, Japan
[21] Appl. No.: 254,773
[22] PCT Filed: Jan. 27, 1988
[86] PCT No.: PCT/JP88/00061
§ 371 Date: Sep. 27, 1988
§ 102(e) Date: Sep. 27, 1988
[87] PCT Pub. No.: WO88/05594
PCT Pub. Date: Jul. 28, 1988

[30] Foreign Application Priority Data

Jan. 27, 1987 [JP] Japan .................. 62-16720

[51] Int. Cl.[5] .................. G11B 5/55; G11B 21/08
[52] U.S. Cl. ..................... 360/78.04; 369/32
[58] Field of Search .................. 369/32, 33, 41; 360/78.01–78.15, 77.03

[56] References Cited

U.S. PATENT DOCUMENTS 4,068,269  1/1978  Commander et al. .......... 360/78.07

FOREIGN PATENT DOCUMENTS 54-93788  7/1979  Japan .
59-180859  10/1984  Japan .
59-180860  10/1984  Japan .
60-193175  10/1985  Japan .

Primary Examiner—Aristotelis M. Psitos
Assistant Examiner—Steven R. Garland
Attorney, Agent, or Firm—Staas & Halsey

[57] ABSTRACT

Disclosed is a head positioning control system and control method for a storage device which maintains the high speed and high density of head positioning and simultaneously lightens the load of the microprocessor or other control circuit used for the head positioning to enable realization by an inexpensive control circuit even with even higher speed operation of the head and/or higher densities of the recording medium. The control system is provided with track cross pulse generation unit able to output either odd or even track cross pulses (PODD or PEVEN) based on position information showing the crossing of the tracks of the recording medium by the head. The control circuit (a) sets, before the start of the speed control, the track cross pulse generation unit so that the odd track cross pulses are output from the track cross pulse generation unit when the target track is odd in number and so that the even track cross pulses are output when the target track is even in number and then performs speed control on the head drive actuator to position the head at the target track, (b) when the first track cross pulse is input, refreshes the track movement balance (DIFF) in accordance with the difference of the head track position before the start of the speed control and target track position, and (c) each time subsequent track cross pulses are input, subtracts two tracks from the track movement balance (DIFF). By this, odd or even track cross pulses showing the target track are input with each two tracks from the track cross pulse generation unit to the control circuit.

19 Claims, 15 Drawing Sheets

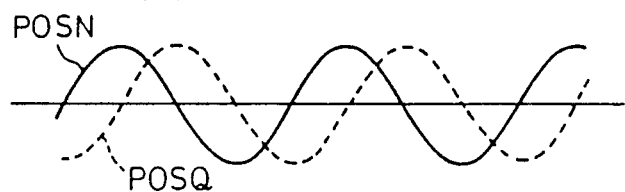

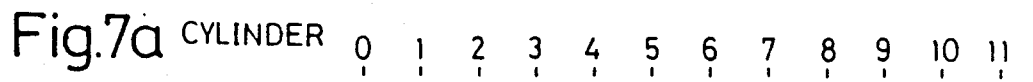
Fig.7a CYLINDER
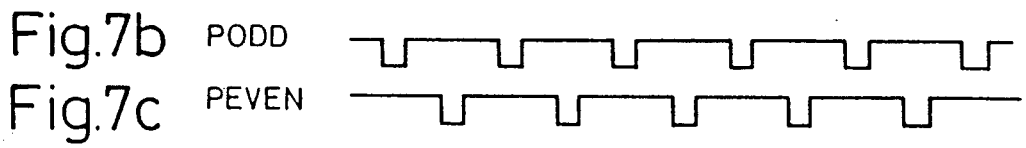
Fig.7b PODD
Fig.7c PEVEN
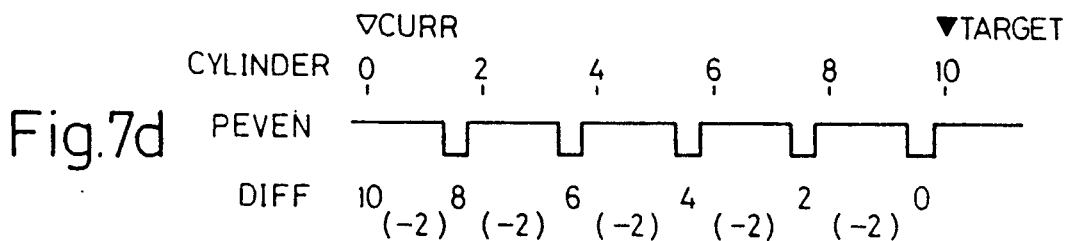
Fig.7d
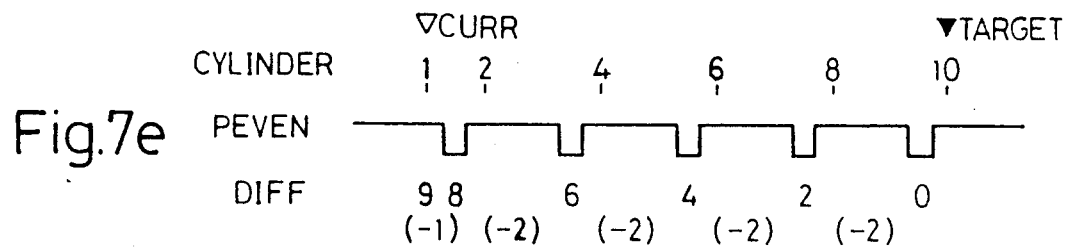
Fig.7e
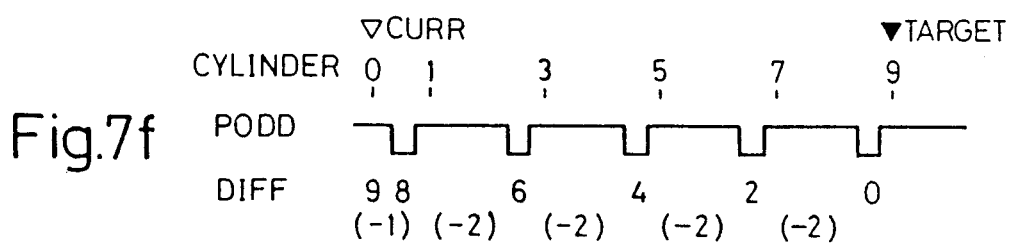
Fig.7f
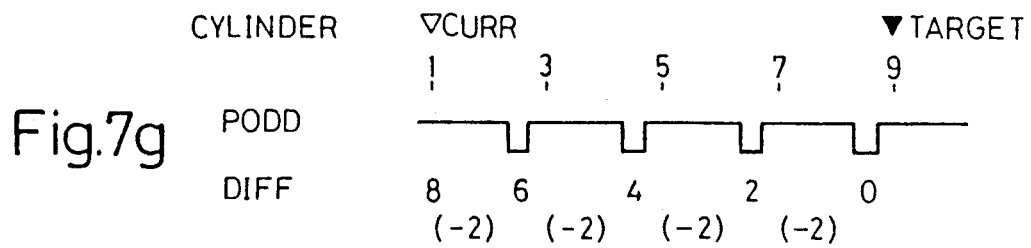
Fig.7g

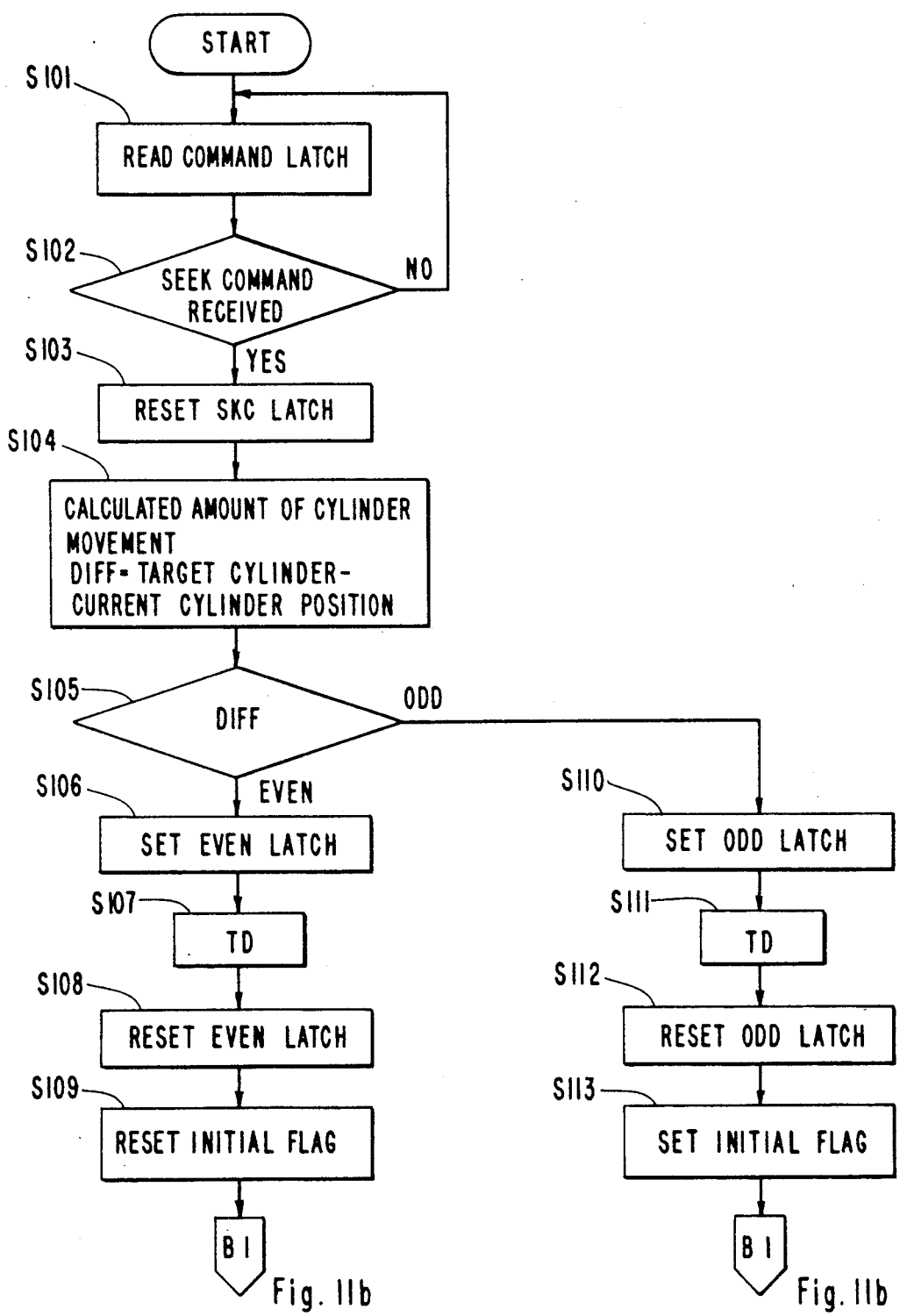

HEAD POSITIONING CONTROL SYSTEM AND METHOD FOR A MEMORY DEVICE USING EVEN AND ODD TRACK CROSS PULSES

BACKGROUND OF THE INVENTION

1. Field of the Invention

The present invention relates to a head positioning control system for a memory device, more specifically relates to a head positioning control system which is provided at the drive control unit of a memory device, which attempts to reduce the control processing load of a control circuit for positioning the head at a target position of a memory medium, and which enables the control circuit to maintain control tracking at a high precision even with respect to higher densities of the memory medium and high speed movement of the head.

2. Description of the Related Art

One example of a memory device in which head positioning is performed, is the magnetic disk apparatus shown in FIG. 1. In FIG. 1, there are shown a magnetic disk control unit 1 connected to a main computer (not shown), a magnetic disk drive control unit 2', a servo head 4 for reading servo information from one magnetic disk, among the magnetic disks, on which the servo information is recorded, and a voice coil motor 9 which moves the servo head 4 and other magnetic heads (not shown) to a target cylinder. FIG. 1 also shows a position signal generation system 5' which issues a cylinder (track) position signal based on servo information from the servo head 4, a speed control system 6 which performs speed control on the servo head 4 to position the servo head at the target cylinder (track) in the coarse control mode, and a position control system 7 which performs fine position control of the servo head 4 to the target cylinder in a fine control mode after the completion of the speed control.

The magnetic disk control unit 1 is provided so as to perform buffered processing to enable access to the magnetic disk apparatus without the main computer (not shown), provided as a host, being affected by the operation of the magnetic disk drive control unit 2' and the magnetic disk drive unit 1.

The magnetic disk drive control unit 2' has, mutually connected via a bus 30, the following: an interface (I/F) unit 21, a microprocessor unit (MPU) 22', a random access memory (RAM) 23' which stores control data, etc., a read only memory (ROM) 24 in which programs for operating the MPU 22' and other control patterns are stored, a timer 25, a ROM 26 which stores the speed control reference table, a digital-analog converter (DAC) 27 which outputs the reference speed Vr as an analog amount, an output register 28' which outputs a mode signal indicating to a multiplexer 81 either the coarse mode or fine mode, an input register 29 which receives as input a track cross pulse TRXP' output from the position signal generation system 5' each time the head cuts across the cylinder, and an analog-digital converter (ADC) 31 which converts the current head position POS to a digital amount.

The position signal generation system 5' has a servo signal amplification circuit 51 which amplifies the servo signal from the servo head 4, a position signal generation circuit 52, a position information generation circuit 53, a track cross pulse generation circuit 54', a wave shaper circuit 55', and a signal change circuit 56. The details of each of these will be given later.

The speed control system 6 has, for providing a reference speed Vr, reference speed table ROM 26, MPU 22', and digital-analog converter (DAC) 27 and, for providing an actual speed Va, circuits 51 to 53 and 56 in the position signal generation system 5', differential circuit 63 for differentiating the position signal POS output from the signal change circuit 56 and outputting an original speed signal Va', a control current detection circuit 83 of the current corresponding to VCM 9 for issuing a feedback signal for correcting the original speed signal Va', and a speed signal generation circuit 61 for receiving as an input the original speed signal Va' and the feedback signal from the control current detection circuit 83 and outputting a corrected speed signal Va. The speed control system 6 further has a speed deviation calculation circuit 62 which outputs the difference $\Delta V$ between the reference speed Vr and the speed signal Va, $\Delta V = Vr - Va$, a multiplexer 81 which outputs the coarse mode speed deviation $\Delta V$, a power amplification circuit 82 which amplifies the speed deviation $\Delta V$ to the VCM 9 drive level, and the VCM 9. The reference speed Vr is obtained by a search of the reference speed table ROM 26 by the MPU 22' based on the difference between the head position POS and target cylinder position input via the ADC 31 and is output as a corresponding analog signal via the DAC 27. Further, a negative feedback loop is formed for the speed by the basic speed feedback circuits 51, 52, 53, 56, 63, and 61 and the supplementary speed feedback circuits 83 and 61.

The position control system 7 is formed by the multiplexer 81 selecting the position deviation $\Delta P$ of the position deviation calculation circuit 71 upon a mode signal from the output register 28' after the end of the speed control. The position control system 7 performs precise control so the position deviation $\Delta P$ with respect to the target cylinder position always becomes zero. Therefore, the head position POS is output by the circuits 51, 52, 53, and 56 as the basic position feedback circuit and the position deviation $\Delta P$ with respect to the target cylinder is output from the position deviation calculation circuit 71. The control current detection circuit 83 generates a supplementary position feedback signal for offset correction. That is, the control current detection circuit 83 provides the supplementary signal to both the speed signal generation circuit 61 and the position deviation generation circuit 71. The position deviation $\Delta P$ is given to the VCM 9 via the multiplexer 81 and the power amplification circuit 82. The VCM 9 operates so that the position deviation $\Delta P$ becomes zero.

When a seek command is given through the magnetic disk control unit 1 from the main computer, the control system of FIG. 1 first performs seek control, that is, performs speed control for positioning to the target track position at maximum speed, then switches to position control. During the position control, data is written in and read out.

The MPU 22' takes various linkages with the magnetic disk control unit through the I/F unit 21 and, further, performs the above-mentioned various other control processing, such as, the data write and read operations, under the speed control and the position control.

FIG. 2 shows in more detail the conventional position signal generation system 5' illustrated in FIG. 1. The position signal generation circuit 52 of FIG. 1 is comprised of the position signal demodulation circuit 52a and the position detection circuit 52b. Further, the position information generation circuit 53 of FIG. 1 is comprised of the position signal slicer 53a and the position decoder 53b. The track cross pulse generation circuit 54' of FIG. 1 is comprised of parallel-arranged set-reset type (RS) flip-flop (FF) 541 to 544 and OR gate circuit 545. As the wave shaper circuit 55', use is made of a monostable multivibrator.

FIG. 2 illustrates a circuit which generates a track cross pulse based on the orthogonal two-phase servo signals PN and PQ. The operation thereof will be explained with reference to FIGS. 3a to 3j. Further, the circuit for generating track cross pulses from the orthogonal two-phase servo signals is disclosed in U.S. Pat. No. 4,068,269, "Positioning System for Data Storage Apparatus and Record Medium for Use Therewith", etc.

In FIG. 2, the servo signal read by the servo head 4 is amplified by the servo amplification circuit 51 and sent to the position signal demodulation circuit 52a. There, the intersecting two position information components PN and PQ are extracted from the servo signal and converted to the two types of orthogonal position signals POSN and POSQ by the position detection circuit 52b, as shown in FIG. 3b. The position signal POSN shows the normal component and the position signal POSQ shows the quadrature component. These signals are used for the detection of the position of the cylinder. The case illustrated in FIG. 3(b), where POSN procedes POSQ, shows that the servo head 4 moves from a small cylinder number to a large cylinder number. Conversely, the case where POSQ precedes POSN shows that the servo head 4 moves in the opposite direction. Thus, they are also used for detection of the direction of movement of the servo head 4. The numerals 0 to 9 shown in FIG. 3a are the cylinder numbers. The POSN signal is a signal which repeats with a period of four cylinders, as shown by the solid line. The POSQ signal is a signal which repeats with a period of four cylinders as shown by the broken line. There is one cylinder's worth of a phase difference between the POSN signal and the POSQ signal.

The position signal slicer 53a compares the voltage of the POSN signal and the POSQ signal. When the voltage of the POSN signal becomes larger than the voltage of the POSQ signal, as shown in FIG. 3c, the (N >Q) signal changes from "0" to "1". Further, when the sum of the voltage of the POSN signal and the voltage of the POSQ signal becomes positive, as shown in FIG. 3d, the (N+Q>0) signal changes from "0" to "1".

The position signal slicer 53a extracts a certain plus-minus range of the voltage of the POSN signal and the voltage of the POSQ signal and, as shown in FIG. 3i, prepares an on-track (ONTRK) signal showing that the servo head 4 is on the cylinder and sends the same to the reset terminal R of the RS flip-flops 541 to 544. The position decoder 53b prepares from the (N>Q) signal and the (N+Q>0) signal, as shown in FIGS. 3(e) to (h), row enable position SQI, SNI, SNN, and SQN signals generated by each of the four cylinders. The SNI signal is applied to the set terminal S of the flip-flop 541, the SNN signal to the set terminal S of the flip-flop 542, the SQI signal to the set terminal S of the flip-flop 543, and the SQN signal to the set terminal S of the flip-flop 544.

The flip-flop 541 is set by the trailing edge of the SNI signal and is reset by the rising edge of the ONTRK signal. The flip-flop 542 is set by the trailing edge of the SNN signal and is reset by the rising edge of the ONTRK signal. The flip-flop 543 is set by the trailing edge of the SQI signal and is reset by the rising edge of the ONTRK signal. The flip-flop 544 is set by the trailing edge of the SQN signal and is reset by the rising edge of the ONTRK signal. The OR gate circuit 20 detects the trailing edge of the signals of SQI, SNI, SNN, and SQN from the flip-flop and sends the results to the wave shaper circuit 55' comprised by a monostable multivibrator as an original track cross pulse wave $TRXP_0'$. The wave shaper circuit 55', as shown in FIG. 3j, sends a cylinder (track) cross pulse TRXP', indicating that the servo head 4 has passed the cylinder, to the magnetic disk drive control unit 2'.

Recent magnetic disk apparatuses use multiprocessors such as the MPU 22' as control apparatuses so as to reduce the number of parts and achieve smaller sizes and further to try to reduce prices and achieve higher performances. Therefore, the MPU 22' therein used is the smallest and most inexpensive possible. On the other hand, the MPU 22', as mentioned earlier, performs the speed control in the seek operation, the data read and write control, and the interface processing with the magnetic disk control unit 1. Moreover, the above-mentioned cylinder (track) cross pulse TPXP' is a signal for confirming the amount of distance the servo head has moved toward the desired position when the MPU 22' performs positioning control of the servo head to a target cylinder under speed control, so in principle the various cylinder cross pulses TRXP' must be input via the input register 29. The input period is, for example, 27 ms.

However, recently, there has been much stronger demands for high speed operation of magnetic disk apparatuses and the speed of movement of the heads has become much higher, shortening the input period of the cylinder cross pulses. Further, the smaller sizes and higher densities of the magnetic disks themselves have led to a reduction of the cylinder pitch. Therefore, the input periods of the cylinder (track) cross pulses have become even further reduced. As a result, the MPU 22', which receives as input the cylinder (track) cross pulses to perform speed control in addition to performing other control processing tasks, is unable to sufficiently follow the input of the cylinder (track) cross pulses. Thus, due to the excessive load, the MPU 22 cannot perform precise speed control.

One method for resolving this would be to use a high performance microprocessor, but this would create the problem of higher costs. As another method for resolving this problem, would be to refrain from using a microprocessor for the positioning control circuit but to constitute it with a hardware circuit, but this method would result in complicated circuitry and increases in the number of parts, cost, and size of the apparatus.

Still another method for resolving the above problem, is known, for example, Japanese Patent Application (JPA) 59-180859 which discloses a "Speed Control Apparatus for a Magnetic Disk Apparatus". This method calls for the head drive motor to be accelerated upon actuation, run at a high speed, and be decelerated near the target cylinder. Among these operations, until the end of the high-speed running of the head, where the cylinder cross pulses are input at short periods, i.e., until the head drive motor enters the deceleration region, the cylinder cross pulses are divided by ½ when input to lighten the load of the MPU. When it enters the deceleration region, the division is stopped and the full cylinder cross pulses are input to the MPU. This method relates to when the head is in the middle of movement and does not affect the precision of final positioning much at all. Moreover, it lightens the load of the MPU in the high speed running region of the motor where the high frequency cylinder cross pulses are input; therefore, it so may be said to input the cylinder cross pulses intermittently.

However, this method causes a speed signal preparation circuit to issue pulses for the division and, further, demands that the MPU engage in processing to detect when the head drive motor has entered the deceleration region and to stop the division at that time. Thus, there is the problem that the overall circuitry becomes complicated. Further, this method suffers from ambiguity of the detection of when the head drive motor has entered the deceleration region, the fact that until the deceleration region it just divides the cylinder cross pulses, and the fact that when switching from divided cylinder cross pulses to nondivided cylinder cross pulses, there are cases where there would be a deviation of one cylinder cross pulse. Moreover, when switching from the coarse control mode to the fine control mode, there are cases where there would be a one cylinder deviation with respect to the target cylinder. This one cylinder deviation cannot be corrected under fine control.

Further, JPA 59-180860, "Speed Control Apparatus for Magnetic Disk Apparatus", discloses a method to lighten the load of the MPU by constantly dividing the cylinder cross pulses and speed controlling the magnetic head based on the divided cylinder cross pulses. This method means operation of the drive system of the magnetic disk apparatus in accordance with the capacity of the MPU, which runs counter to the inherent purpose, namely, to control of perform high speed seek control by operating the drive system of the magnetic disk apparatus at maximum performance. Thus, this method runs counter to the idea of control and further uses just divided cylinder cross pulses, so there are cases of one cylinder's worth of deviation in the positioning precision.

JPA 60-193175, "Head Positioning System", lightens the load of the MPU and eliminates the inaccuracy of positioning precision of the prior art mentioned above. For this purpose, it provides a counter circuit for counting the cylinder cross pulses, outside the MPU, to accurately detect the position of the magnetic head and has the count of the counter circuit applied to the MPU. On the other hand, the MPU, as mentioned above, is interrupted by ½ divided cylinder (track) cross pulses before the head drive motor enters the deceleration region and, when the head drive motor enters the deceleration region, is interrupted by nondivided cylinder (track) cross pulses. The MPU receives as input the count of the counter circuit with every interruption. However, this head positioning system has the problem of higher cost, since it provides a counter circuit outside the MPU. Further, the MPU must read in the count of the counter circuit with each interruption and clear the counter circuit. Also, the interface between the MPU and counter circuit and the processing for the same become complicated.

Above, an example was given of the load of the microprocessor used for head positioning control in the case of a magnetic disk apparatus used as a memory device. However, the above problems also apply to the case of a microprocessor used for an optical disk apparatus, opo-magnetic disk apparatus, and the like which perform head positioning simultaneously with other control processing.

SUMMARY OF THE INVENTION

The present invention has as its object providing a head positioning control system and method thereof for a memory device which can maintain the high speed and high precision head positioning of the memory device and simultaneously lighten the load on the control circuit used for the head positioning control.

Further, the present invention has as its object the realization of the above head positioning control system for a memory device by a simple circuit construction and simple interface.

According to a first basic aspect of the present invention, there is provided a head positioning control system for a storage device comprising: a position information generation circuit which detects from servo signals recorded on a rotary disk recording medium the cylinder positions of the rotary disk recording medium of the head and generates the obtained position information; a speed control system having a control circuit for receiving as input the head position signal defined based on position information from said position signal generation system and positioning the above-mentioned head to a given target track position; and track cross pulse generation means for outputting either of the odd track cross pulses or even track cross pulses based on the position information from the position signal generation system, and wherein the control circuit is configured so as (a) to set, before the start of the speed control, the track cross pulse generation means so that the odd track cross pulses are output from the track cross generation means when the target track is odd in number and so that the even track cross pulses are output when the target track is even in number and then to perform speed control on the head drive actuator to position the head at the target track, (b) to, when the first track cross pulse is input, update the track movement balance in accordance with the difference between the target track position and the head track position before the start of the speed control, and (c) to, each time subsequent track cross pulses are input, subtract two tracks from the track movement balance, whereby odd or even track cross pulses showing the target track are input with each two tracks from the track cross pulse generation means to the above-mentioned control circuit.

Preferably, the control circuit is provided with a microprocessor unit.

Further, according to a first embodiment, the track cross pulse generation means can be provided with a first gate circuit for outputting the even track cross pulses based on position information from the signal position generation system, a second gate circuit for outputting the odd track cross pulses based on other position information from the track cross pulse generation circuit, an even pulse latch circuit which is set by the control circuit and which is provided so that the even track cross pulses are input from the first gate circuit to the control circuit, and an odd pulse latch circuit which is set by the control circuit and which is provided so that the odd track cross pulses are input from the second gate circuit to the control circuit.

The position signal generation system comprises a position signal generation circuit which generates perpendicularly intersecting two-phase servo signals from the servo signals and a position information generation circuit which generates four types of position information based on the two-phase servo signals. The first gate circuit of the track cross pulse generation means can be formed to generate even track cross pulses based on two types of position information corresponding to one orthogonal phase, and the second gate circuit of the track cross pulse generation means can be comprised so as to generate odd track cross pulses based on the other two types of position information corresponding to the other orthogonal phase.

The refresh operation of the track movement balance when the first track cross pulse is input subtracts 2 whenever the target track and initial head track position are both even or odd and otherwise subtracts 1.

Preferably, the control circuit receives as input the even track cross pulses or odd track cross pulses from the track cross pulse generation means and performs speed control only when the track movement difference between the target track and the initial head track position is above a predetermined value and receives as input the track cross pulses from the position signal generation system and performs positioning control when the track movement difference is under the predetermined value.

According to a second embodiment, the track cross pulse generation means can comprise a D-type flip-flop, and an AND gate circuit for dividing in half the track cross pulses from the above-mentioned position signal generation system, an even pulse latch circuit which has an output connected to the preset terminal of the D-type flip-flop and which is provided so that even track cross pulses are timely output from the AND gate circuit by pulse driving before the start of speed control by the control circuit, and an odd pulse latch circuit which is provided so that the odd track pulses are timely output from the AND gate circuit by pulse driving before the start of speed control by the control circuit.

The position signal generation system of the second embodiment is provided with a position signal generation circuit which generates orthogonal two-phase servo signals from the servo signals, a position information generation circuit which generates four types of position information based on the two-phase servo signals, and a track cross pulse generation circuit which generates the track cross pulses each time the head crosses a track based on the four types of position information. The track cross pulses from the track cross pulse generation circuit are connected to the clock terminal of the D-type flip-flop of the track cross pulse generation means, one of the outputs of the D-type flip-flop is connected to the D input terminal, and the track cross pulses from the track cross pulse generation circuit and the other output of the D-type flip-flop are connected to the input terminal of the AND gate circuit of the track cross pulse generation means.

The refresh operation of the track movement balance when an initial track cross pulse is input subtracts 2 when the difference between the target track and the initial head track position is even and subtracts 1 when it is odd.

In this case too, the control circuit can receive as input the odd track cross pulses or the even track cross pulses from the track cross pulse generation means and perform positioning control only when the track movement difference between the target track and the initial head track position is above a predetermined value, and receive as input the track cross pulses from the position signal generation system and perform positioning control when the track movement difference is under the predetermined value.

According to a second basic aspect of the present invention, there is provided a head positioning control method for a storage device wherein pulses of a head crossing a cylinder of a rotary disk recording medium are generated based on servo signals recorded on the rotary disk recording medium and the head is positioned at a target track based on the cylinder cross pulses, said head positioning control method comprising (a) the step, before beginning to drive the head, of setting a track cross pulse generation means which outputs either odd track cross pulses or even track cross pulses from the cylinder cross pulses so that even track cross pulses are output when the target track is even in number and so that odd track cross pulses are output when the target track is odd in number, (b) the step of speed controlling, based on a reference speed, an actuator for driving the head based on the difference between the target track and a current head track position, and (c) during the speed control period, (i) the sub-step of refreshing the track movement balance in accordance with the difference between the track position of the head just before the driving begins and the target track when the initial track cross pulse is output from the cross pulse generation means and (ii) the sub-step of refreshing by two tracks each the track movement balance for the output of the second and subsequent track cross pulses from the track cross pulse generation means, thereby positioning the head to the target track based on either even track cross pulses or odd track cross pulses.

BRIEF DESCRIPTION OF THE DRAWINGS

FIG. 6a to FIG. 6j are timing charts showing the generation of cylinder cross pulses in the head positioning control system of FIG. 5;

FIG. 7a to FIG. 7g are operational charts showing how positioning is performed to the target cylinder in the head positioning control system of FIG. 5;

DESCRIPTION OF THE PREFERRED EMBODIMENTS

Figure 1:
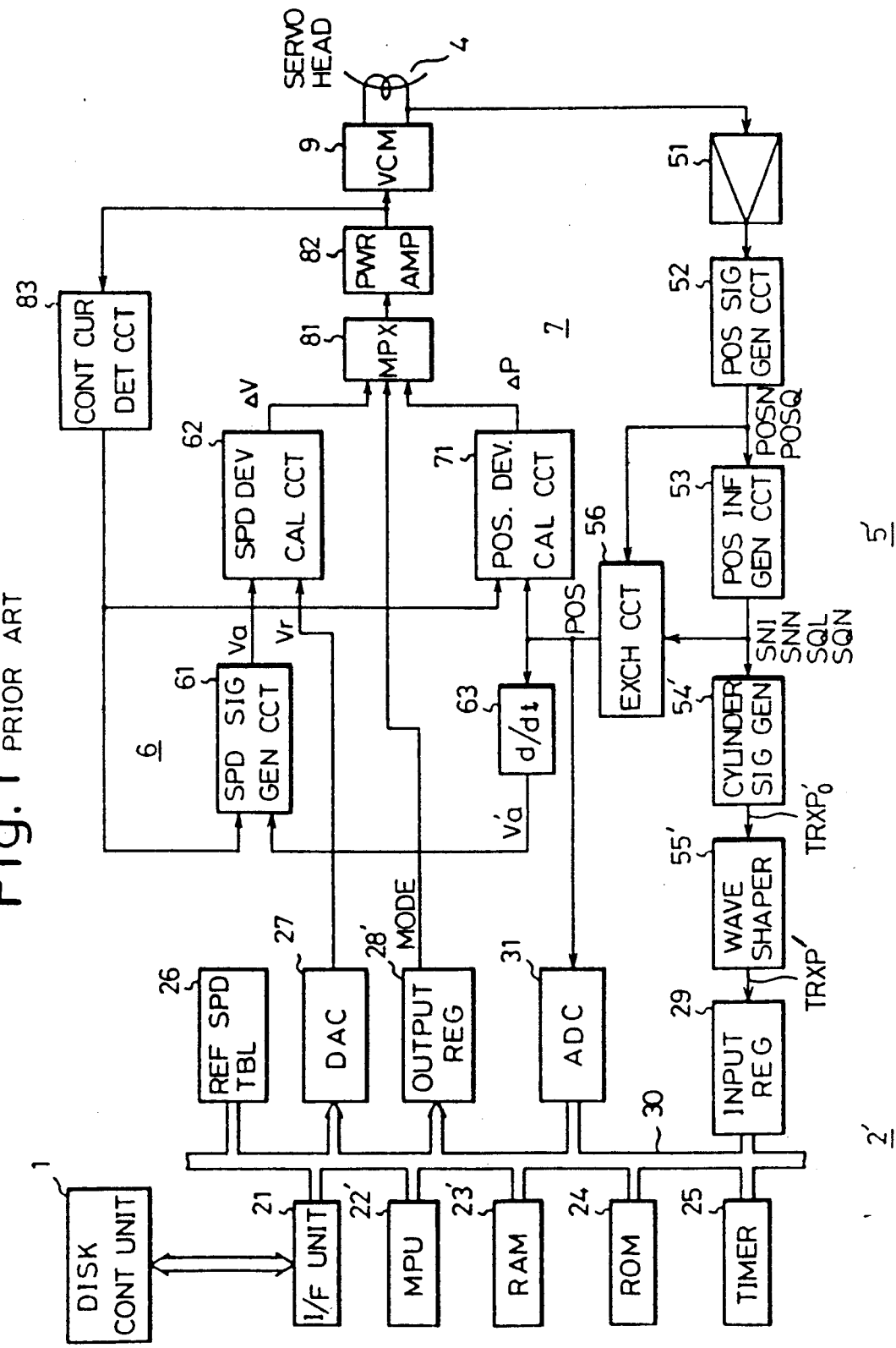
FIG. 1 is a block diagram of a conventional head control system for a magnetic disk apparatus.
Figure 4:
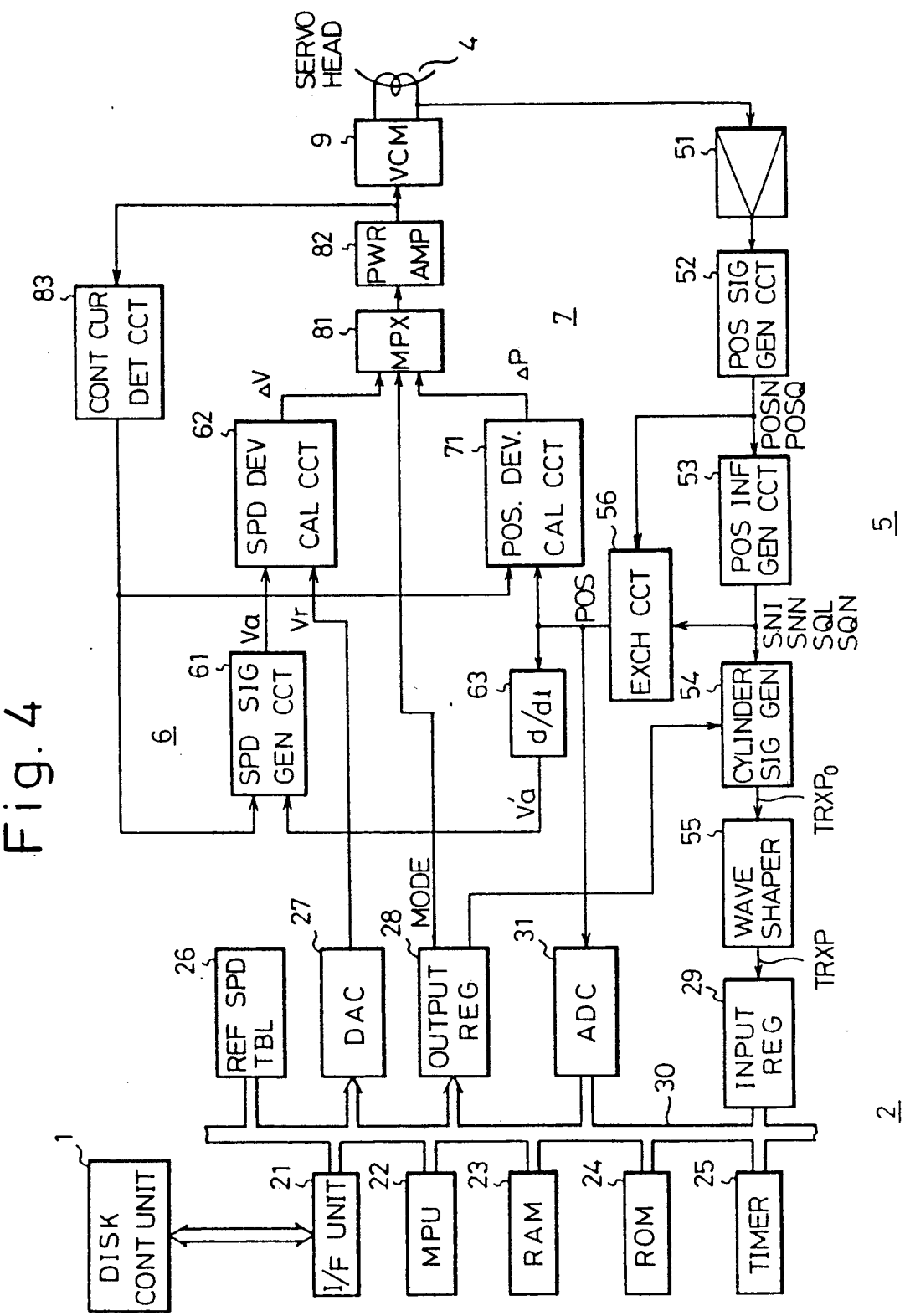
FIG. 4 is a block diagram of a head control system suitable for use in the magnetic disk apparatus according to one embodiment of the present invention.

FIG. 4 is a block diagram of a head control system for a magnetic disk apparatus encompassing a positioning control system in a magnetic disk apparatus according to one embodiment of the head positioning control system for a memory device of the present invention. The head control system shown in FIG. 4 is an improvement over the head control system shown in FIG. 1. Therefore, the basic operation of subjecting a voice coil motor (VCM) 9 used as a head drive actuator to speed control in the coarse control mode and positioning the servo head 4 at the target cylinder (track) in response to a seek command from a magnetic disk control unit 1, then positioning the servo head accurately at the target cylinder in the fine control mode is the same as mentioned above in relation to FIG. 1. However, as mentioned in detail referring to FIG. 5, the track cross pulse generation circuit 54 in the position signal generating system 5, which constitutes part of the speed control system, and the magnetic disk drive control unit 2 are different from those of FIG. 1.

Figure 2:
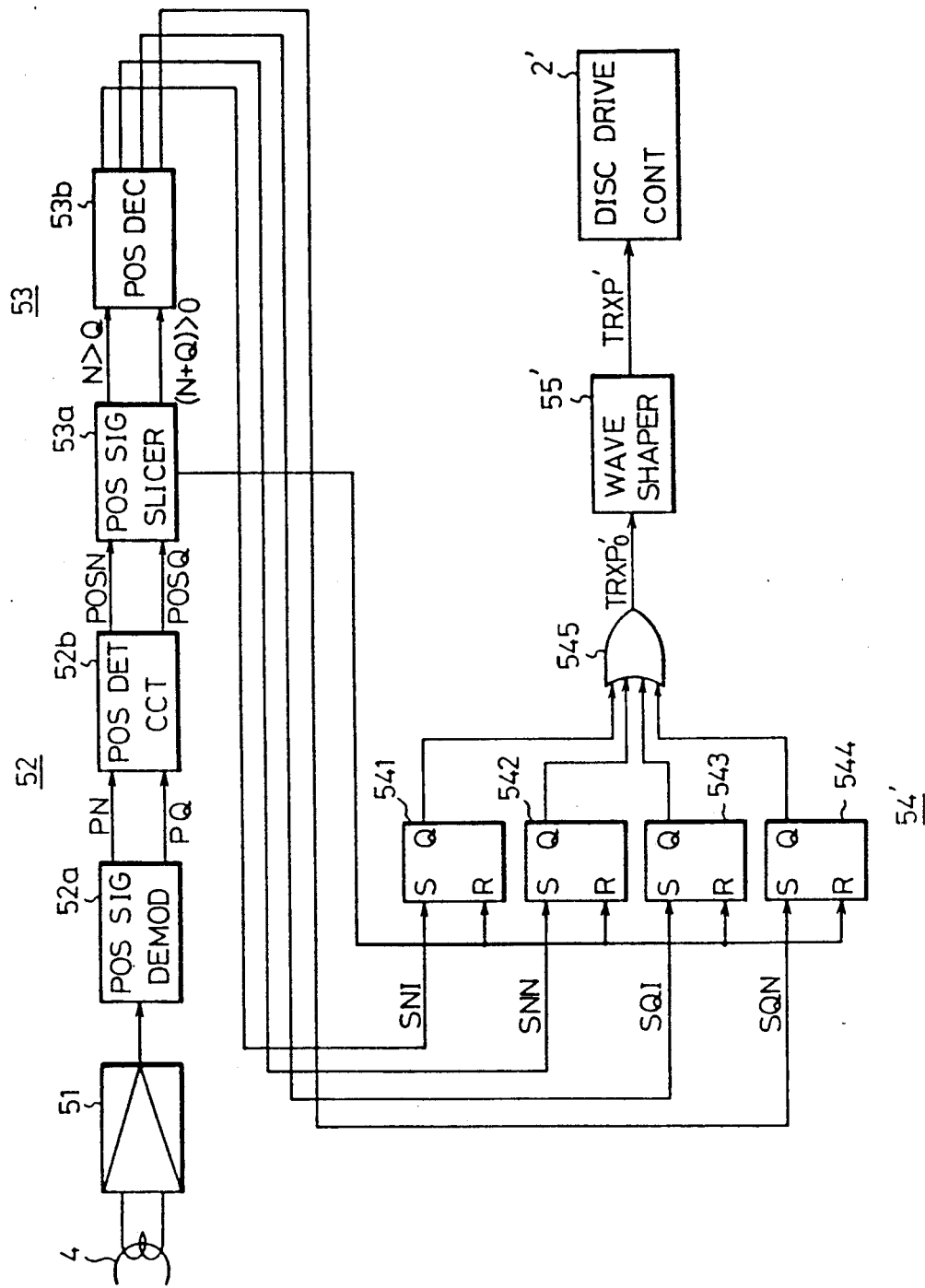
FIG. 2 is a block diagram showing the head positioning control system portion of FIG. 1.
Figure 3:
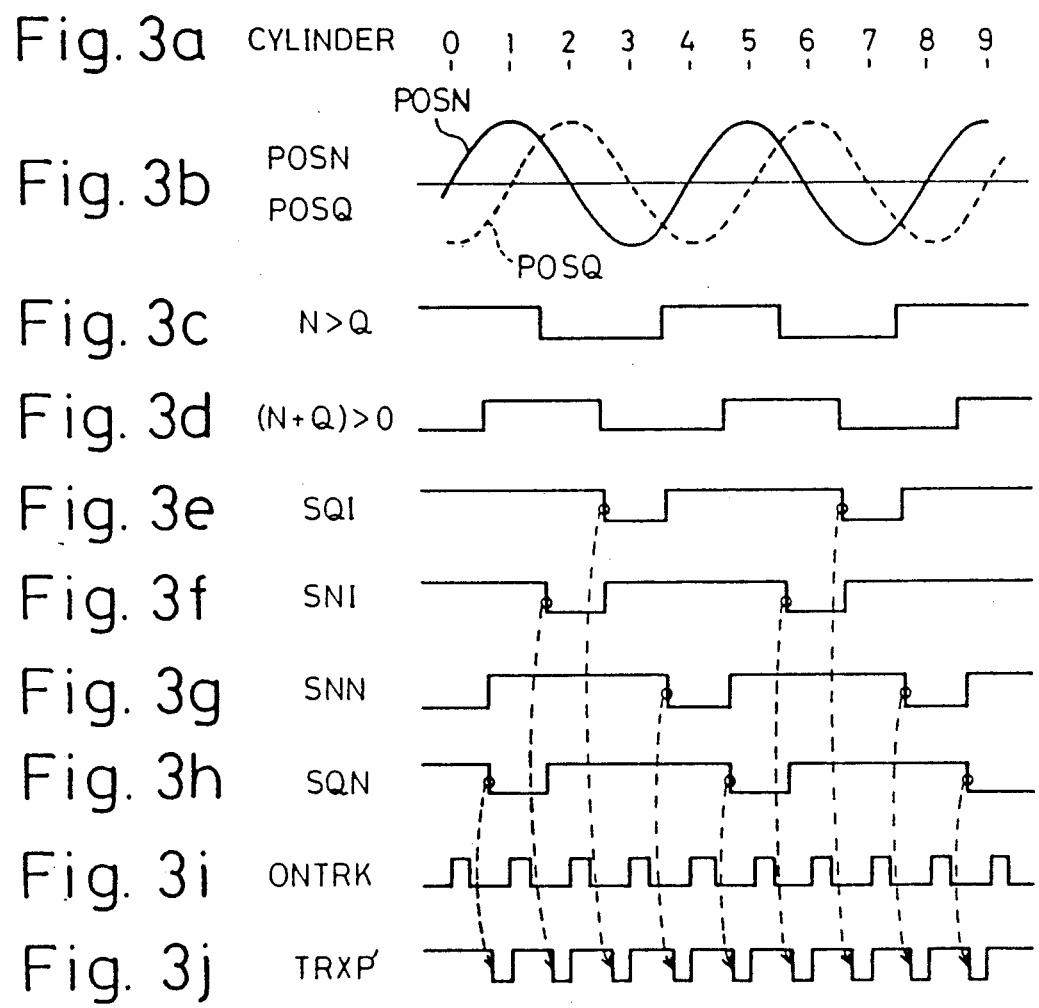
FIG. 3a to FIG. 3j are timing charts showing the generation of cylinder cross pulses of the head positioning control system of FIG. 2.
Figure 5:
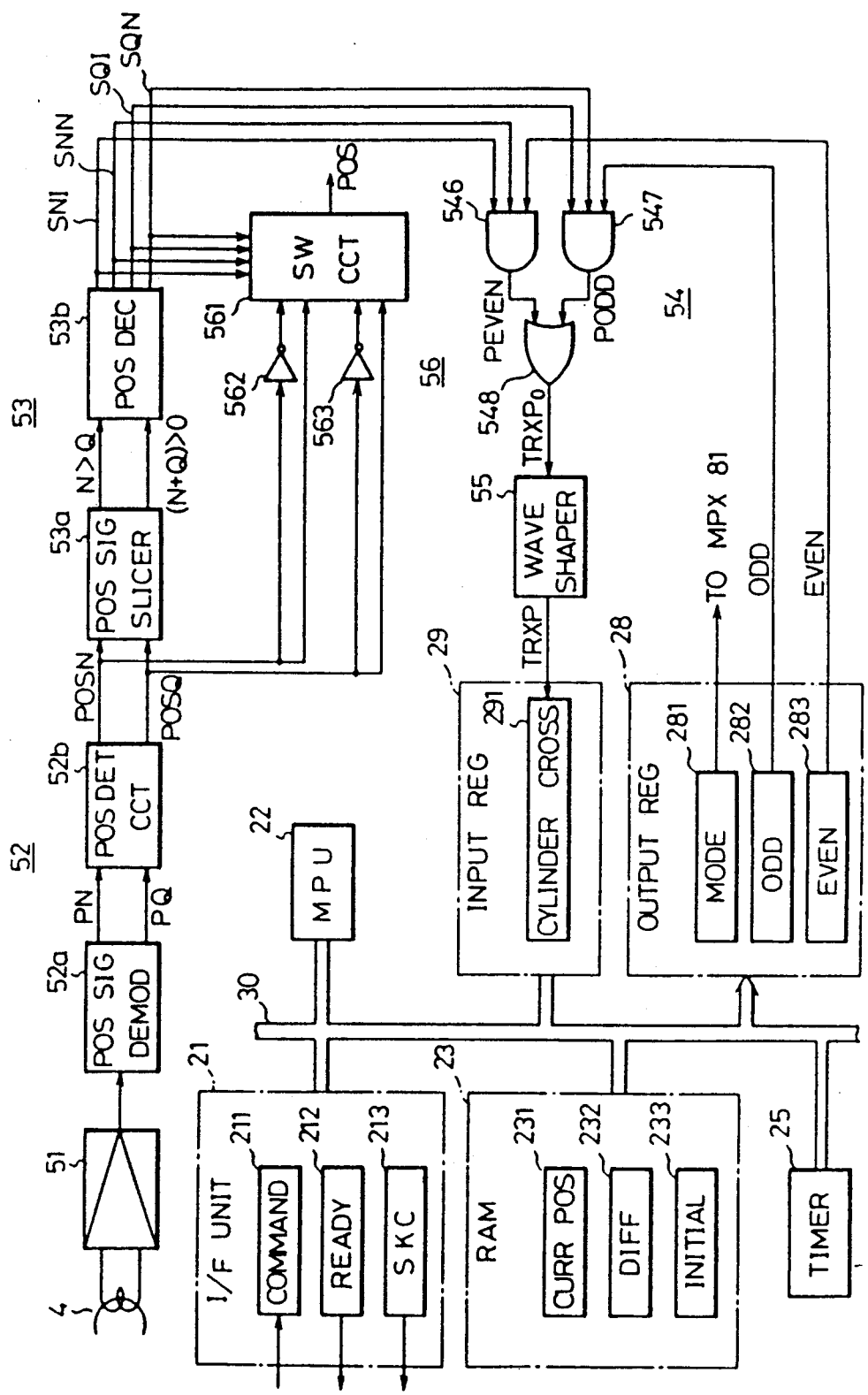
FIG. 5 is a block diagram of the head positioning control system in FIG. 4.

FIG. 5 shows the head positioning unit corresponding to FIG. 2 for the head control system shown in FIG. 4. In the head positioning system of FIG. 5, the servo head 4, the position signal circuit 52, which is comprised of the position signal demodulation circuit 52a and the position detection circuit 52b and which generates the orthogonal two-phase position signals POSN and POSQ, and the position information generation circuit 53, which is comprised of the position signal slicer 53a and the position decoder 53b and which generates four types of position information SNI, SNN, SQI, and SQN, are the same as those mentioned earlier in reference to FIG. 2. The signal change circuit 56 outputs a position signal POS with a predetermined slope based on the two-phase position signals POSN and POSQ. That is, when the phase relationship of the signals POSN and POSQ is reversed in accordance with the direction of movement of the head, the slope of the sine wave illustrated in FIG. 6b reverses. Therefore, the signal change circuit 56 inputs the signals POSN and POSQ to the switch circuit 561 and inverting the signals POSN and POSQ through the inverters 562 and 563 inputs them to the switch circuit 561. In addition, based on the position information SNI, SNN, SQI, and SQN from the position decoder 53b, the switch control 561 outputs a position signal POS with a predetermined slope.

The track cross pulse generation circuit 54 is comprised of two AND gate circuits 546 and 547 and the OR gate circuit 548. The AND gate circuit 546 is provided to output a row enable even cylinder (track) cross pulse PEVEN at the trailing edge of the position information SNI and SNN, as shown in FIG. 6f, FIG. 6g, and FIG. 6j, in the state where a row enable signal is applied from an even pulse (EVEN) latch 283 in the later-mentioned output register 28. The AND gate circuit 547 is provided to output a row enable odd cylinder (track) cross pulse PODD at the trailing edge of the position information SQI and SQN, as shown in FIG. 6e, FIG. 6h, and FIG. 6i, in the state where a row enable signal is applied from an odd pulse (ODD) latch 282 in the output register 28. The OR gate circuit 548 outputs either of the odd cylinder cross pulse PODD or the even cylinder cross pulse PEVEN as the track cross pulse TRXPo to the wave shaper circuit 55.

The wave shaper circuit 55 is comprised of, for example, a monostable multivibrator. The wave shaper circuit 55 wave shapes the track cross pulse TPXPo and inputs the same as a wave shaped track cross pulse TRXP in the cylinder cross pulse latch 291 in the input register 29. The value input in the cylinder cross pulse latch 291 is input to the MPU 22 via the bus 30.

The output register, 28 connected through the bus 30 to the MPU 22, includes the ODD latch 282 and EVEN latch 283 and also a MODE latch 281. In a seek operation, the MPU 22 sets the MODE latch 281 to set the coarse control mode. By this, the multiplexer 81 (FIG. 4) outputs the speed deviation $\Delta V$ of the speed deviation calculation circuit 62 to the power amplifier 82, upon which speed control is performed. When the servo head 4 is positioned to the target cylinder and the seek operation is completed, the MPU 22 resets the MODE latch 281. By this, the multiplexer 81 outputs the position deviation $\Delta P$ of the position deviation calculation circuit 71 to the power amplifier 82 and precision positioning control to the target cylinder is performed in the fine control mode.

The RAM 23 has a current position memory 231 which stores the current head position, a difference memory 232 which stores the later mentioned amount of cylinder movement (or cylinder movement balance) DIFF, and an initial flag 233.

The interface (I/F) unit 21 has a command latch 211, a ready latch 212, and a seek completion (SKC) latch 213 for obtaining linkages between the magnetic disk control unit 1 and MPU 22.

FIG. 7a to FIG. 7c, similar to FIG. 6a, FIG. 6i, and FIG. 6j, show that the odd cylinder cross pulses PODD and even cylinder cross pulses PEVEN are output alternately from the AND gate circuits 547 and 546 along with the crossing of a cylinder by the head. FIG. 7d to FIG. 7g show how the cylinder movement balance DIFF should be refreshed using either the odd cylinder cross pulses or even cylinder cross pulses in the relationship between the current position CURR and the target cylinder TARGET. As shown by FIG. 7a to FIG. 7c, based on the signals SNI, SNN, SQI, and SQN from the position information generation circuit 53, the cylinder cross pulses to be output with each cylinder crossing are divided into odd cylinder cross pulses PODD and even cylinder cross pulses PEVEN. When one of these cylinder cross pulses is used for positioning control of the head, as shown in FIG. 7d to FIG. 7g, there are four possible cases.

FIG. 7d shows that when the current position CURR is an even cylinder, for example, 0, and the target cylinder TARGET is also even, for example, 10, the cylinder cross pulse used for positioning control is to be the even cylinder cross pulse PEVEN since the target cylinder TARGET is even. Next, the cylinder movement difference DIFF showing the cylinder movement balance is subtracted by 2 at the initial point for initial adjustment in the case of use of an even cylinder cross pulse. Subsequent to this, it is subtracted by 2 each time an even cylinder cross pulse PEVEN is input. This is because the even cylinder cross pulses are divided in half. When DIFF=0, the head is positioned at the target cylinder.

FIG. 7e shows that when the current position CURR is an odd cylinder, for example, 1, and the target cylinder TARGET is even, for example, 10, since the target cylinder TARGET is even, use is made of the even cylinder pulse PEVEN for the positioning control. Further, the cylinder movement difference DIFF is subtracted by 1 at the initial point for initial adjustment and thereafter subtracted by 2 with each cylinder pulse input.

FIG. 7f shows that when the current position CURR is 0 (even) and the target cylinder TARGET is 9 (odd), use is made of the odd cylinder pulse PODD for positioning and the cylinder movement difference DIFF is subtracted by 1 at the initial point for initial adjustment.

FIG. 7g shows that when the current position CURR is 1 (odd) and the target cylinder TARGET is 9 (odd), use is made of the odd cylinder pulse PODD for the positioning and the cylinder movement difference DIFF is subtracted by 2 for initial adjustment.

Figure 8A:
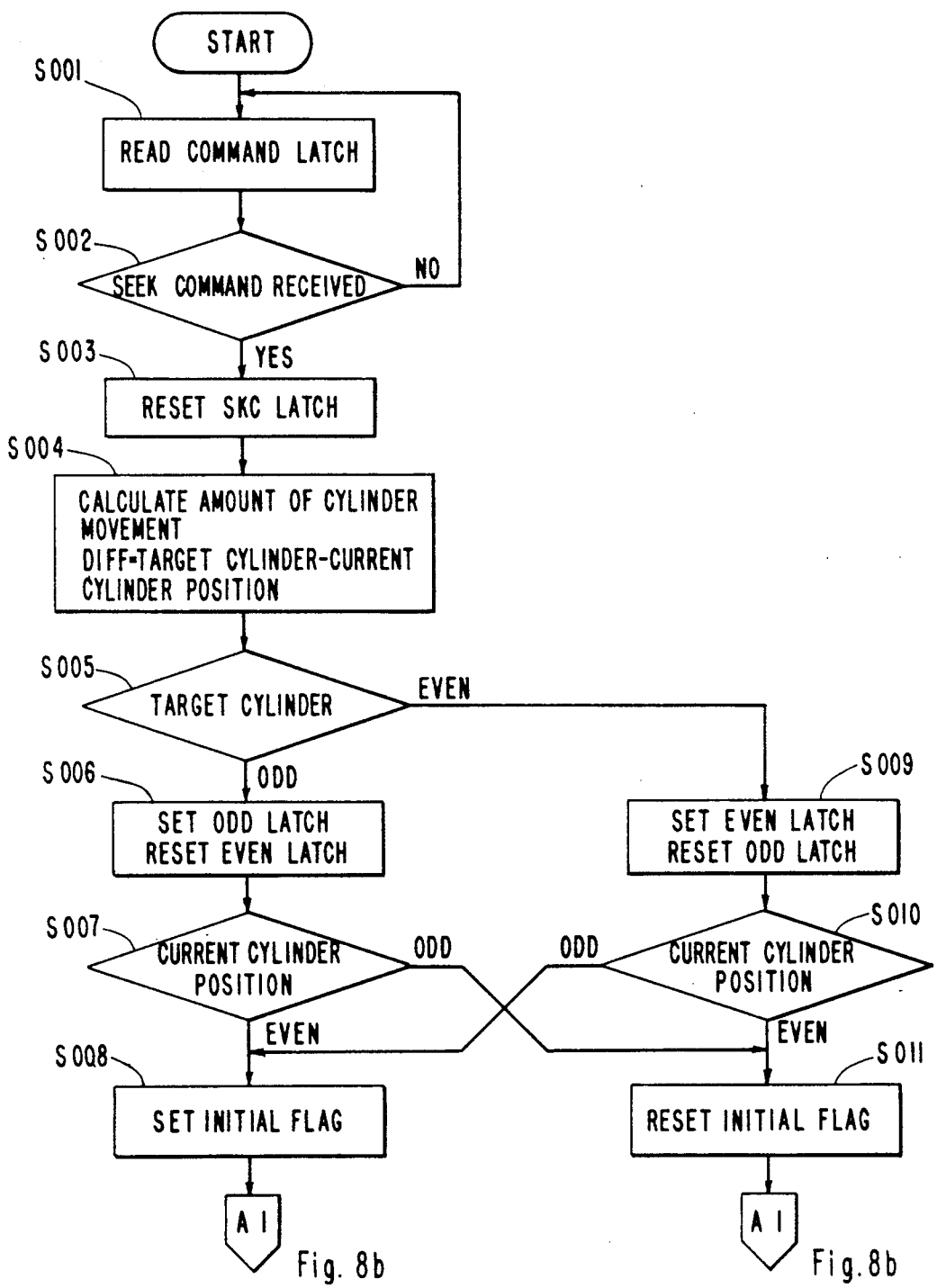
FIG. 8a to FIG. 8c are flow charts showing the positioning control operation of the head positioning control system of FIG. 5.
Figure 8:
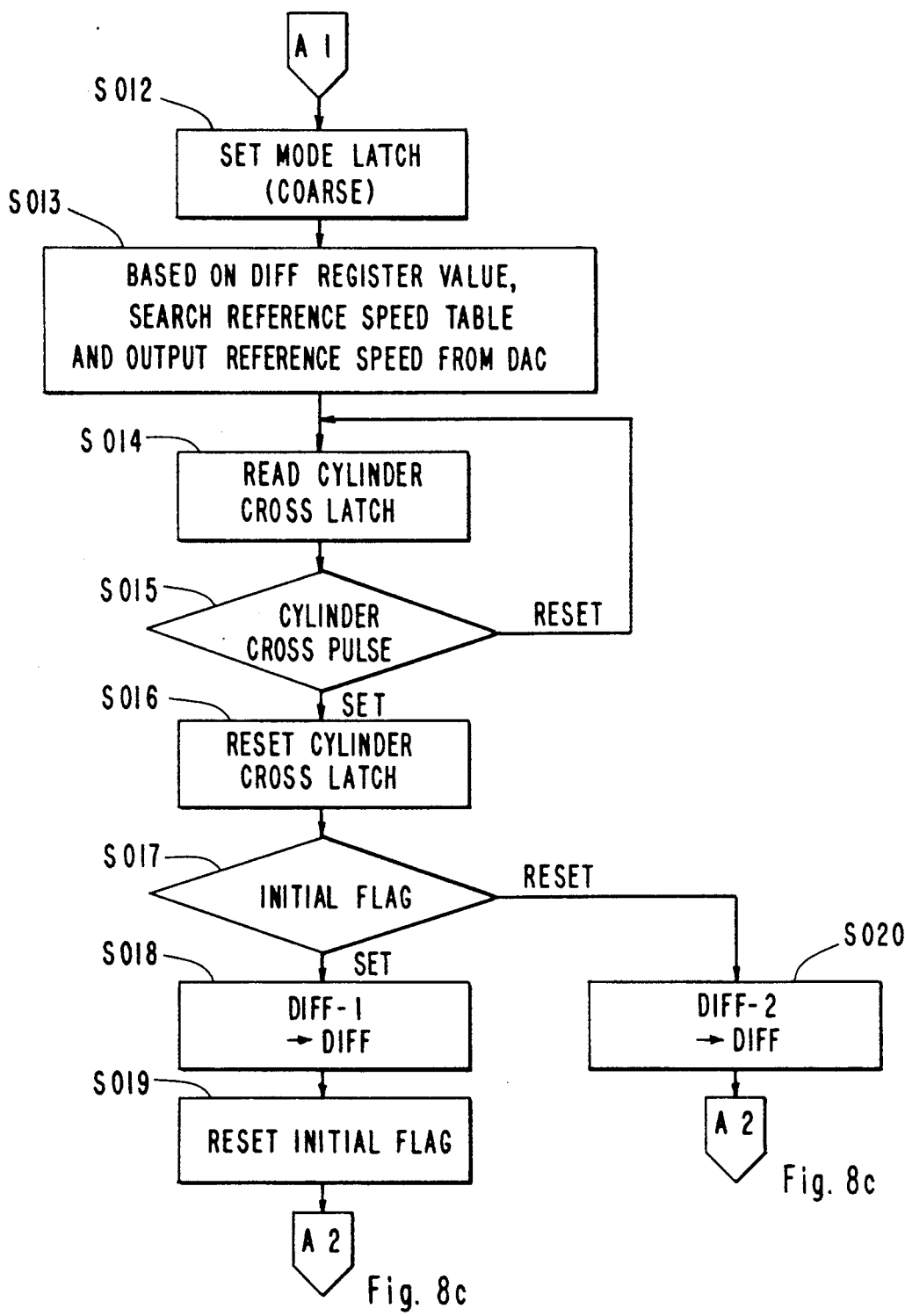
Figure 8:
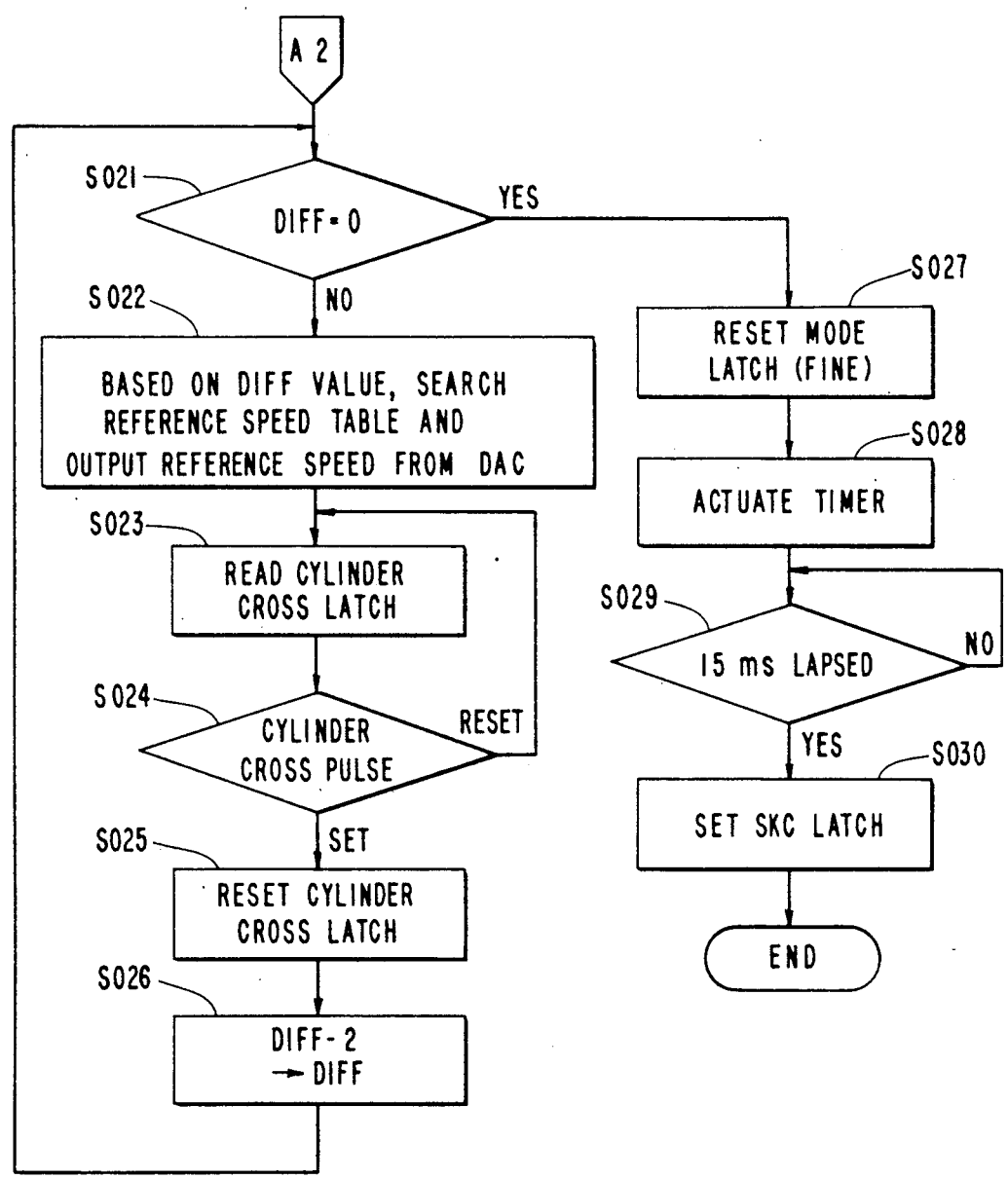

The control system of FIG. 5 for performing the head positioning control corresponding to the above four types of operation modes will be explained with reference to the flow charts of FIG. 8a to FIG. 8c.

Steps S001 and S002

The MPU 22 reads the COMMAND latch 211 in the I/F unit 21 (S001) and checks if a seek command has been issued from the magnetic disk control unit 1 (S002). When no seek command has been issued (NO), the above operation is repeated so the MPU stands by until a seek command is issued.

Steps S003 and S004

When a seek command is issued, the MPU 22 resets the seek completion (SKC) latch 213 in the I/F unit 21 (S003). By this, it prohibits the issuance of a new seek command until the completion of the current seek operation.

The MPU 22 receives as input the target cylinder received along with the seek command and stores the same in the current position memory 231 in the RAM 23. Further, the MPU 22 subtracts the current cylinder position of the current position memory 231 in the RAM 23 from the received target cylinder and calculates the cylinder movement difference DIFF (S004). This cylinder movement difference DIFF shows the cylinder movement balance and is stored in the difference memory 232 in the RAM 23.

Steps S005 to S0011

The MPU 22, in accordance with the modes of FIG. 7d to FIG. 7g, decides which of the odd cylinder cross pulses or even cylinder cross pulses to use. Since the odd cylinder cross pulses PODD are used when the target cylinder position is odd, the MPU 22 sets the ODD latch 282 in the output register 28 and resets the EVEN latch 283 (S005 and S006). Since the even cylinder cross pulses PEVEN are used when the target cylinder position is even, the MPU 22 resets the EVEN latch 283 and sets the ODD latch 282 (S005 and S009).

Next, the MPU 22 decides on the state of the initial flag for determining whether to subtract 1 or subtract 2 from the cylinder movement balance DIFF at the initial point of time for initial adjustment. When the initial flag is "1", the cylinder movement balance DIFF is subtracted by 1 and when it is "0", it is subtracted by 2. Therefore, when the current cylinder position and the target cylinder are in the state shown in FIG. 7e and FIG. 7f, the MPU 22 sets the initial flag to "1" (S007, S010, and S008). On the other hand, when the current cylinder position and the target cylinder position are as FIG. 7d and FIG. 7g, the MPU 22 resets the initial flag to "0" (S007, S010, and S011).

Steps S012 to S020

The MPU 22 sets the MODE latch 281 in the output register 28 and selects and drives the coarse control mode, i.e., the speed control mode (S012).

Next, the MPU 22 searches the reference speed table in the reference speed table ROM 26 based on the cylinder movement balance DIFF, extracts the corresponding reference speed of the VCM 9, passes that digital value through the DAC 27, and outputs the same as an analog amount reference speed Vr to the speed deviation calculation circuit 62 (S013). By this, the head is moved toward the target cylinder based on the reference speed Vr.

When the head moves and either of the odd cylinder cross pulses PODD or the even cylinder cross pulses PEVEN selected by the ODD latch 282 or the EVEN latch 283, respectively, are output from the track cross pulse generation circuit 54, the cylinder cross pulse latch 291 is set. The MPU 22 waits for the cylinder cross pulse latch 291 to be set (S014 and S015). When the cylinder cross pulse latch 291 is set, the MPU 22 resets the cylinder cross pulse latch 291 (S016) so that the next cylinder crossing may be detected.

When the initial flag is set in response to the initial cylinder cross pulse input, the MPU 22 subtracts 1 from the cylinder movement balance DIFF (DIFF-1) (S018) and further resets the initial flag (S019). When the initial flag is reset, the MPU subtracts 2 from the DIFF (DIFF-2) (S020).

Steps S021 to S026

After this, the MPU performs the following operation until DIFF=0, i.e., until the head reaches the target cylinder.

In accordance with the DIFF, it outputs the reference speed to the speed Vr deviation calculation circuit 62 (S022) and performs speed control. It then inputs the fact that the cylinder cross pulse latch 291 is set (S023 and S024) and resets the cylinder cross pulse latch 291 (S025). The cylinder cross pulses, i.e., the odd cylinder cross pulses PODD or the even cylinder cross pulses PEVEN, are input every two cylinders, so the MPU 22 subtracts 2 from the DIFF (S026).

Here, the cylinder cross pulse latch 291 is set with each movement of the two cylinders, so the operation of the MPU 22 of steps S021 to S026 may be performed with each two cylinders of movement, i.e., at two times the time intervals of FIG. 2 and the operational speed of the MPU 22 may be half. Therefore, the load of the MPU 22 is lightened by half.

Steps S021 and S027 to S030

When the DIFF becomes zero (S021), the MPU 22 resets the MODE latch 281 (S027) and switches from the coarse control mode to the fine control mode. As a result, precision positioning control is performed at the target cylinder.

When the DIFF becomes zero, the head is always positioned at the target cylinder, which fact will be clear from the previous explanation made with reference to FIG. 7d to FIG. 7g. Therefore, the switching from the coarse control mode to the fine control mode at step S027 is performed after the positioning to the target cylinder in exactly the same way as in the case of the positioning with input of a cylinder cross pulse with every pulse. The MPU 22 performs the setting operation. That is, it actuates the timer 25 (S028) and waits for 15 ms (S029). Next, the MPU 22 sets the seek completion latch 213 (S030) and notifies the magnetic disk control unit 1 of the completion of the seek operation.

As mentioned above, according to the first embodiment of the present invention, the odd cylinder cross pulses and even cylinder cross pulses, comprising alternately divided cylinder cross pulses, are generated by a track cross pulse generating circuit 54 and depending on whether the target cylinder position is odd or even, a decision is made on which of the odd cylinder cross pulses and even cylinder cross pulses to be used for the speed control. In accordance with the current cylinder position, initial adjustment is made of the subtraction of the cylinder movement balance when an initial cylinder cross pulse is input. After this, use is made of the ½ divided odd cylinder cross pulses or even cylinder cross pulses for accurate positioning control to the target cylinder. During this positioning control, the input cylinder cross pulses have a frequency of ½ the original cylinder pulses, so the load on the MPU 22 is lightened by ½. Therefore, when the speed of movement of the head rises and cylinder pitch is shortened or even in the case of either, the MPU 22 can sufficiently follow up the pulses.

Figure 9:
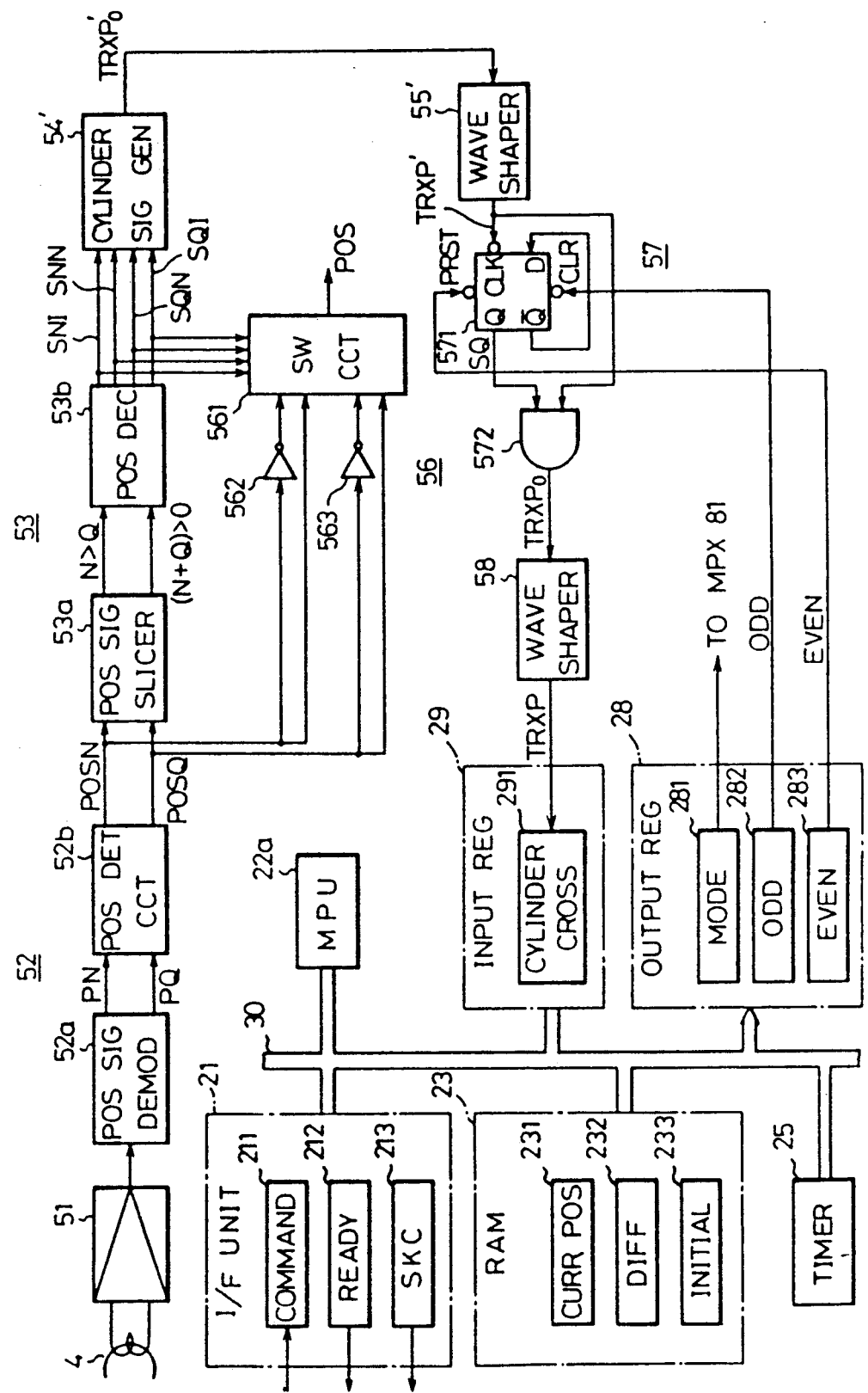
FIG. 9 is a block circuit diagram of a head positioning control system suitable for use in a magnetic disk apparatus according to another embodiment of the present invention.
Figure 10A:
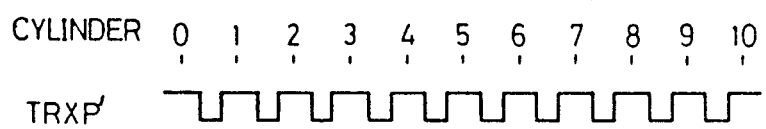
FIG. 10a to FIG. 10c are operational charts showing how positioning is performed to the target cylinder in the head positioning control system of FIG. 9.

A second embodiment of the head positioning control system of the present invention will be shown in FIG. 9. The head positioning control system of FIG. 9 provides a second track cross pulse generation circuit 57 and a wave shaper circuit 58 after the track cross pulse generation circuit 54' and the wave shaper circuit 55' shown in FIG. 2. A track cross pulse TRXP' is output from the wave shaper circuit 55' as shown in FIG. 10a.

The second track cross, pulse generation circuit 57 is comprised of a D-type flip-flop 571 and an AND gate circuit 572, as illustrated. That is, the track cross pulse TRXP' is applied to an inverse clock terminal CLK of the D-type flip-flop 571 and is applied to the AND gate 572. The inverted output Q of the D-type flip-flop 571 is connected to the data, input terminal D. By this, it will be understood that the D-type flip-flop 571 operates as a ½ frequency divider. Further, the output of the EVEN latch 283 is connected to the preset terminal PRST of the D-type flip-flop 571, and the output of the ODD latch 282 is connected to the clear terminal CLR. The wave shaper circuit 58 is comprised by a monostable multivibrator.

The head positioning control system of FIG. 9 does not use either of the two ½ divided pulses such as the odd cylinder cross pulses or even cylinder cross pulses as in the case of the head positioning control system of FIG. 5, but uses one ½ divided track cross pulse TRXP. However, to perform the same processing as in FIG. 7d to FIG. 7g explained by the head positioning control system of FIG. 5, as shown in FIG. 10b and FIG. 10c, the output timing of the Q output SQ of the D-type flip-flop 571 is determined by the initial value of the cylinder movement difference DIFF and a pulse corresponding to the even, cylinder cross pulses (FIG. 10b, TRXP (EVEN)) or the odd cylinder cross pulses (FIG. 10c, TRXP (ODD)) is output from the AND gate circuit 572.

Figure 11:
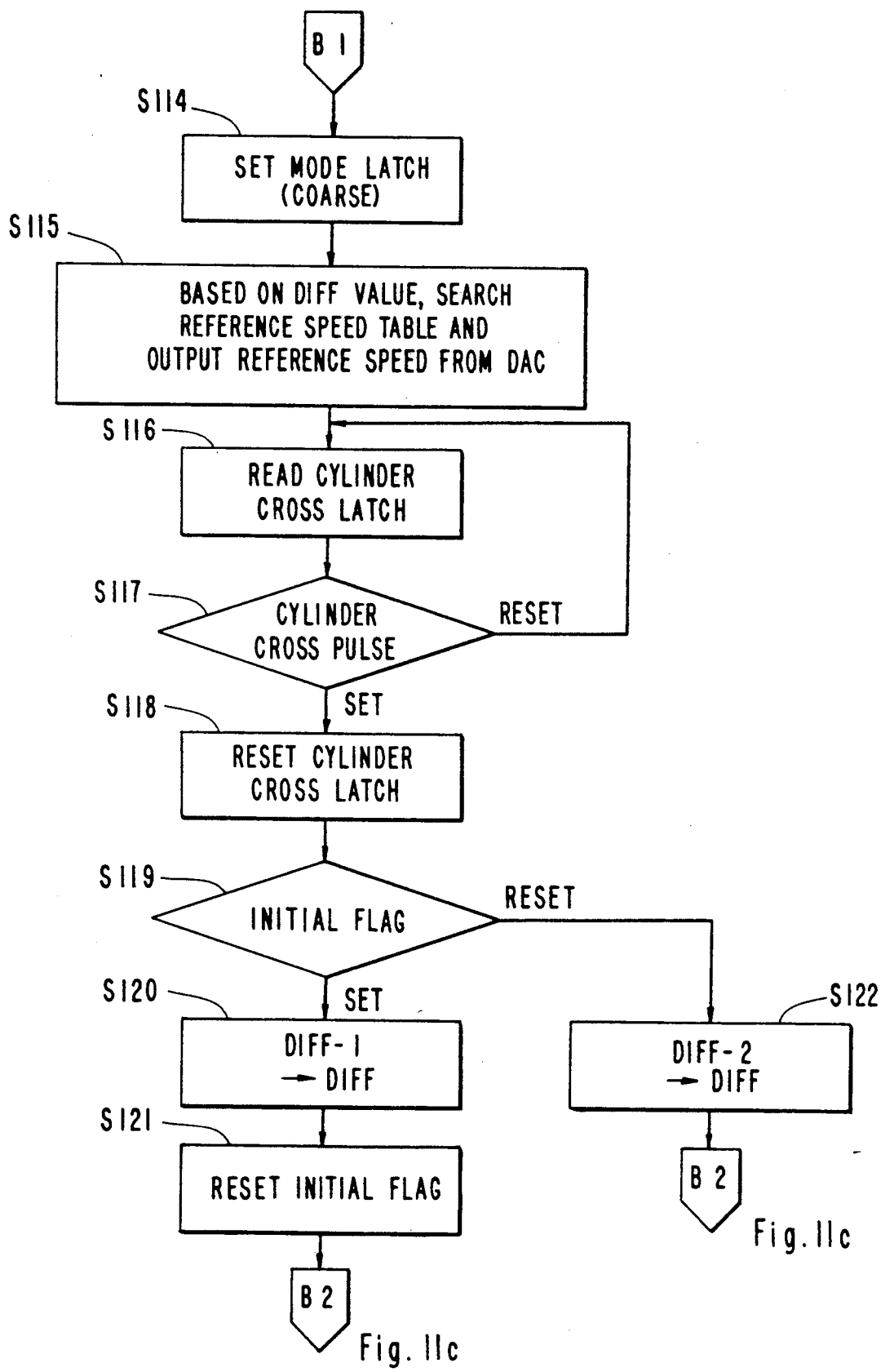
FIG. 11a to FIG. 11c are flow charts showing the positioning control operation of the head positioning control system of FIG. 9.
Figure 11C:
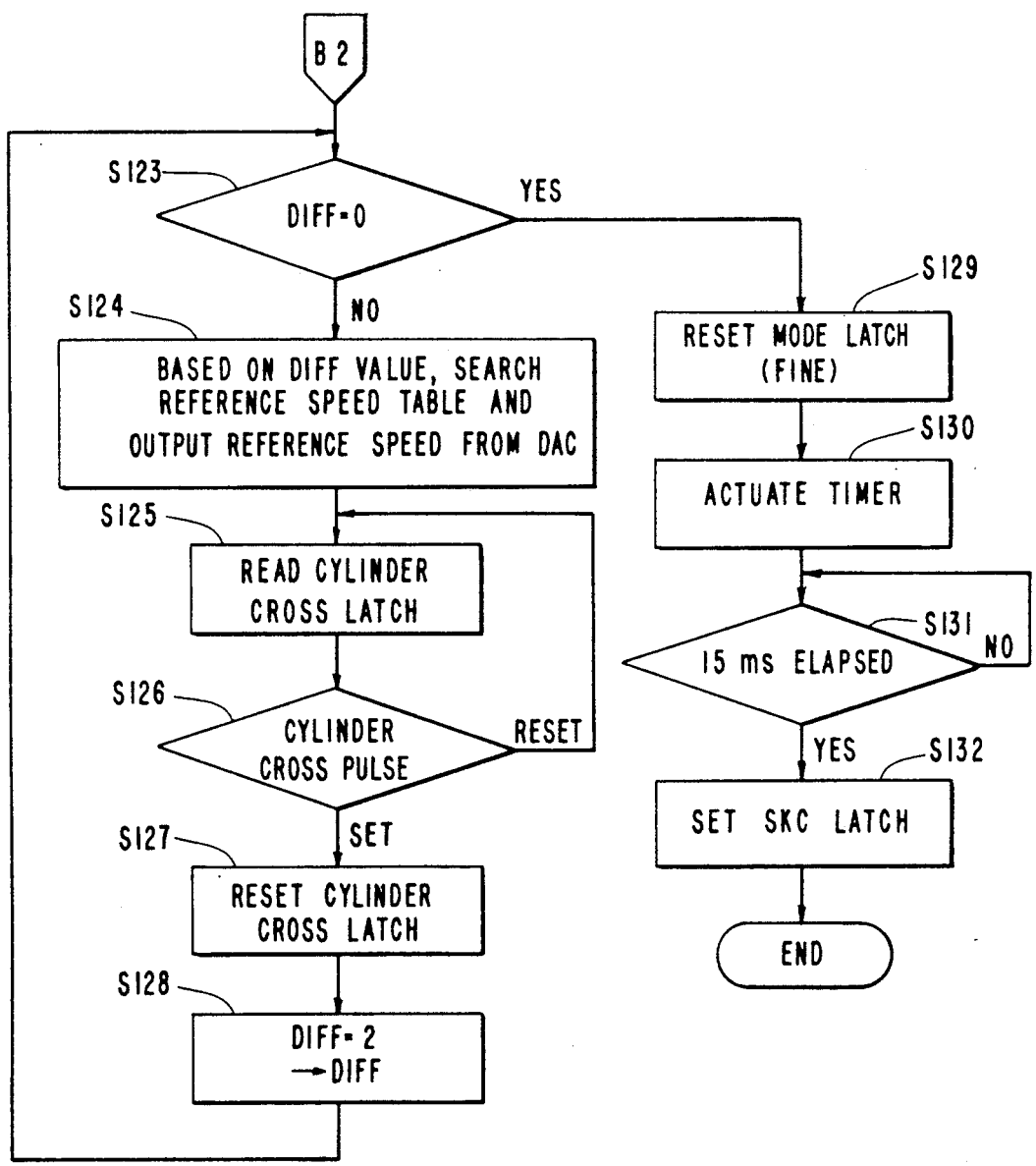

Therefore, as shown by steps S105 to S113 in FIG. 11a, when the DIFF is even, the MPU 22a sets once the EVEN latch 283 (S106), waits a predetermined time (S107), then resets the EVEN latch 283 (S108), and outputs the preset pulse from the EVEN latch 283 to the preset terminal PRST of the D-type flip-flop. On the other hand, when the DIFF is odd, the MPU 22a once sets the ODD latch 282 (S110), waits a predetermined time (S111), then resets the ODD latch 282 (S112), and outputs a clear pulse from the ODD latch 282 to the clear terminal of the D-type flip-flop 571.

Figure 10B:
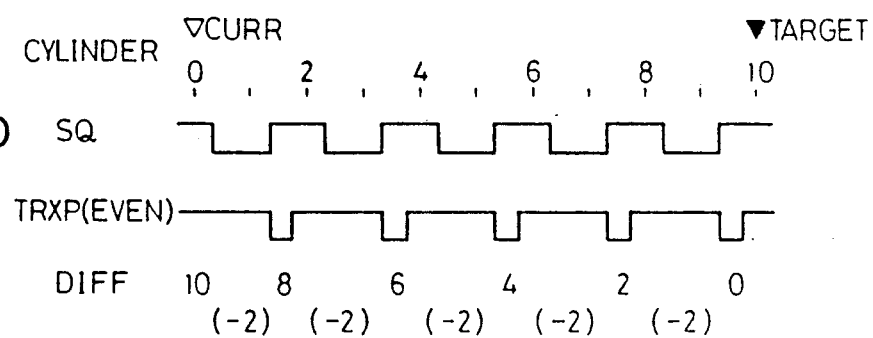
Figure 10C:
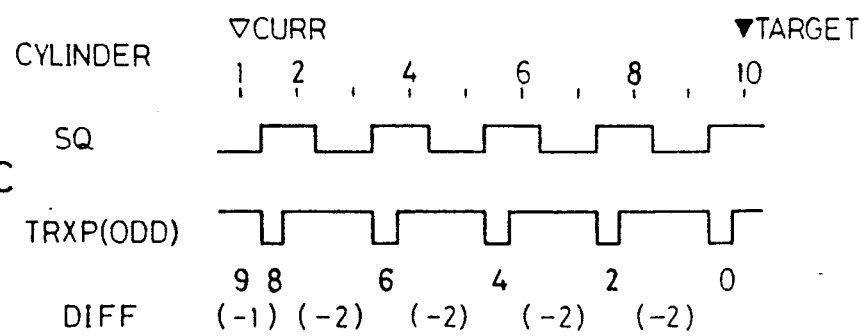

In FIG. 10b and FIG. 10c, initial adjustment of the DIFF is required for the input of the divided initial cylinder cross pulse in accordance with whether the initial value of the cylinder movement difference DIFF is even or odd. Therefore, at step S109 in FIG. 11a, the initial flag is reset and, at step S113, the initial flag is set. In accordance with the setting or resetting of the initial flag, the initial adjustment of the DIFF is performed at steps S119 to S122 in FIG. 11b in the same way as steps S017 to S020 in FIG. 8b.

The other operations are the same as with the head positioning control system of FIG. 5 explained with reference to FIG. 8a to FIG. 8c.

The above embodiment was described in relation to the case where the amount of head movement in the seek operation was two cylinders or more. When the amount of head movement upon receipt of a seek command is one cylinder, the initial odd cylinder cross pulse or even cylinder cross pulse is input and the seek operation completed.

The above embodiment illustrated the case where the amount of head movement was relatively large, but when the amount of head movement is a relatively small one of from one cylinder to three cylinders, it is not necessary to use divided cylinder cross pulses, or odd cylinder cross pulses or even cylinder cross pulses, but use may be made of full cylinder cross pulses as in the prior art for the speed control.

Further, the above embodiment was explained with reference to the case of use of a microprocessor as the head positioning control, but the same applies to the case of use of an equivalent microcomputer or specialized hardware circuit.

The above embodiment was explained with reference to the head positioning control system of a magnetic disk apparatus, but the present invention of course can also be applied to other memory devices requiring the same positioning control, for example, optical disk apparatuses and opto-magnetic disk apparatuses.

As mentioned above, in the present invention, the load of the microcomputer and other control circuits is lightened, so sufficient head positioning control becomes possible even with an inexpensive and low performance control circuit even with higher speed head operation and higher density recording mediums.

What is claimed is:

1. A head positioning control system for a head moved by a head drive actuator in a recording device capable of accessing a rotary disk recording medium having servo signals recorded thereon, comprising:

a position signal generation system using the servo signals recorded in the rotary disk recording medium to detect cylinder positions of the head relative to the rotary disk recording medium and to generate a head position signal;

track cross pulse generation means for selectively outputting odd track cross pulses and even track cross pulses as output track cross pulses based on the position signal from said position signal generation system; and a speed control system having a control circuit for receiving as input the head position signal and for positioning the head to a target track position, the control circuit (a) setting, before starting speed control, said track cross pulse generation means so that odd track cross pulses are output from said track cross pulse generation means when the target track position is odd in number and so that even track cross pulses are output when the target track position is even in number and then to perform speed control no the head drive actuator to position the head at the target track position, (b) when a first track cross pulse is detected, refreshing track movement balance in accordance with a difference between an initial head track position before starting the speed control and the target track position, and (c) each time subsequent track cross pulses are detected, subtracting two tracks from the track movement balance, whereby during one continuous movement of the head only one of odd and even track cross pulses are output with each two tracks from said track cross pulse generation means to the control circuit.

2. A head positioning control system according to claim 1, wherein the control circuit is provided with a microprocessor unit operatively connected to said track cross pulse generation means.

3. A head positioning control system according to claim 2, wherein said track cross pulse generation means comprises:

a first gate circuit, operatively connected to said position signal generation system, for outputting the even track cross pulses based on the head position signal from said position signal generation system, a second gate circuit, operatively connected to said position signal generation system, for outputting the odd track cross pulses based on the head position signal from said position signal generation system, an even pulse latch circuit, operatively connected to said first gate circuit and the control circuit, set by the control circuit and provided so that the even track cross pulses are output from said first gate circuit to the control circuit, and an odd pulse latch circuit, operatively connected to said second gate circuit and the control circuit, set by the control circuit and provided so that the odd track cross pulses are output from said second gate circuit to the control circuit.

4. A head positioning control system according to claim 3, wherein said position signal generation system comprises
a position signal generation circuit, operatively connected to the head drive actuator, for generating perpendicularly intersecting two-phase servo signals from the servo signals, and
a position information generation circuit, operatively connected to said position signal generation circuit and said track cross pulse generation means, for generating four types of position information based on the two-phase servo signals,
wherein said first gate circuit of said track cross pulse generation means generates the even track cross pulses based on two of the four types of position information corresponding to one orthogonal phase, and
wherein said second gate circuit of said track cross pulse generation means generates the odd track cross pulses based on the other two of the four types of position information corresponding to the other orthogonal phase.

5. A head positioning control system according to claim 4, wherein the refreshing of the track movement balance, when the first track cross pulse is detected, subtracts 2 whenever the target track position and the initial head track position are both even or odd and otherwise subtracts 1.

6. A head positioning control system according to claim 5, wherein the control circuit receives as input one of the even track cross pulses and the odd track cross pulses from said track cross pulse generation means and performs speed control only when the difference between the target track position and the initial head track position is above a predetermined value, and receives as input the output track cross pulses and performs positioning control when the difference is under the predetermined value.

7. A head positioning control system according to claim 5, wherein the control circuit receives as input one of the even track cross pulses and the odd track cross pulses from said track cross pulse generation means and performs speed control only when the difference between the target track position and the initial head track position is above a predetermined value and receives as input the track cross pulses from said position signal generation system and performs positioning control when the difference is under the predetermined value.

8. A head positioning control system according to claim 2, wherein said track cross pulse generation means comprises:

a divider circuit, including a D-type flip-flop having a clock terminal operatively connected to said position signal generation system, an output terminal, an inverted output terminal, a preset terminal, a clear terminal, and a data terminal connected to the inverted output terminal, an AND gate, having a first input terminal connected to the output terminal of the D-type flip-flop, a second input terminal connected to the clock terminal, and an output terminal, for producing the output track cross pulses, an even pulse latch circuit, operatively connected to the control circuit and said divider, having an output connected to the preset terminal of the D-type flip-flop and providing timing for the even track cross pulses output from the output terminal of the AND gate circuit, and an odd pulse latch circuit, operatively connected to the control circuit and said divider, having an output connected to the clear terminal of the D-type flip-flop and providing timing for the odd track cross pulses output from the output terminal of the AND gate circuit.

9. A head positioning control system according to claim 8, wherein said position signal generation system comprises:
a position signal generation circuit, operatively connected to the head drive actuator, for generating orthogonal two-phase servo signals from the servo signals,
a position information generation circuit, operatively connected to said track cross pulse generation means, for generating four types of position information based on the two-phase servo signals, and a standard track cross pulse generation circuit, operatively connected to said position information generation circuit and said track cross pulse generation means, for generating standard track cross pulses each time the head crosses a track, based on the four types of position information, wherein the standard track cross pulses from the standard track cross pulse generation circuit are supplied to the clock terminal of the D-type flip-flop of the track cross pulse generation means, and wherein the output track cross pulses are output from the output terminal of the AND gate circuit of said track cross pulse generation means by dividing the standard track cross pulses in half using said divider circuit and said AND gate.

10. A head positioning control system according to claim 9, wherein the refreshing of the track movement balance, when the first track cross pulse is detected, subtracts 2 when the difference between the target track position and the initial head track position is even and otherwise subtracts 1.

11. A head positioning control method for a storage device wherein pulses of a head crossing a cylinder of a rotary disk recording medium are generated based on servo signals recorded on the rotary disk recording medium and the head is positioned at a target track based on the cylinder cross pulses, said head positioning control method comprising the steps of:

(a) setting, before driving the head, a track cross pulse generation unit which outputs one of odd track cross pulses and even track cross pulses of the cylinder cross pulses, the even track cross pulses output when the target track is even in number and the odd track cross pulses output when the target track is odd in number, and (b) controlling, based on a reference speed, speed of an actuator driving the head based on a first difference between the target track and a current head track position, including the substeps of:

(i) refreshing track movement balance in accordance with a second difference between an initial track position of the head just before driving the head and the target track when an initial track cross pulse is output from the track cross pulse generation means, and (ii) refreshing by two tracks the track movement balance for the output of a second and subsequent track cross pulses from the track cross pulse generation means, and (c) positioning the head to the target track based on one of the even track cross pulses and the odd track cross pulses.

12. A head positioning control system for a memory storage device having a servo head and a plurality of cylinders, said head positioning control system comprising:

position information generation means for receiving first and second orthogonal two-phase position signals corresponding to a position of the servo head and generating first, second, third and fourth row enable position signals, all having a row enable frequency;

track cross pulse generation means, receiving the first, second, third and fourth row enable position signals, for generating an even track cross pulse wave and an odd track cross pulse wave each having a frequency twice as great as the row enable frequency; and control means for positioning the servo head in dependence upon one of the even track cross pulse wave and the odd track cross pulse wave.

13. A head positioning control system according to claim 12, further comprising:

an output register, operatively connected to said track cross pulse generation means and said control means, or selecting one of the even track cross pulse wave and the odd track cross pulse wave, respectively, as a track cross pulse wave; and an input register, operatively connected to said track cross pulse generation means and said control means, for inputting the track cross pulse wave to said control unit.

14. A head positioning control system according to claim 13, wherein said head positioning control system controls positioning of the servo head at a target cylinder.

wherein said control means moves the servo head towards the target cylinder from a current cylinder until a cylinder difference, the current cylinder less the target cylinder, is reduced to zero, the cylinder difference being reduced in increments of 2 when the current cylinder and the target cylinder are both odd and when both are even, and wherein said control means performs speed control based upon the cylinder difference.

15. A head positioning control system according to claim 14, wherein said track cross pulse generation means comprises:

a first AND gate for receiving the first and second row enable signals as inputs and outputting the even track cross pulse wave; and a second AND gate for receiving the third and fourth row enable signals as inputs and outputting the odd track cross pulse wave.

16. A positioning control system according to claim 14, wherein said track cross pulse generation means comprises:

a first track cross pulse generation circuit, operatively connected to said position information generation means, for generating a standard track cross pulse wave; and a second track cross pulse generation circuit, operatively connected to said first track cross pulse generation circuit, for generating one of the even track cross pulse wave and the odd track cross pulse wave.

17. A positioning control system according to claim 16, wherein said output register outputs an even signal and an odd signal to said track cross pulse generation means, and wherein said second track cross pulse generation circuit comprises a D-type flip-flop producing an output signal and an inverted output signal and having a clock input operatively connected to receive the standard track cross pulse wave, a clear input operatively connected to receive the odd signal from said output register, a preset input operatively connected to receive the even signal from said output register, and a data input operatively connected to receive the inverted output signal, the output signal being provided as the track cross pulse wave.

18. A method for positioning a servo head from a current cylinder to a target cylinder of a memory storage device, comprising the steps of:

(a) calculating a cylinder movement difference by subtracting the current cylinder from the target cylinder;
(b) moving the servo head towards the target cylinder in dependence upon a predetermined reference speed and the cylinder movement difference;
(c) detecting an odd cylinder crossing by the servo head if the target cylinder is odd and an even cylinder crossing if the target cylinder is even;
(d) updating the cylinder movement difference after said detecting of step (c) by reducing the cylinder movement difference by 2 if the current cylinder and the target cylinder are both odd and if both are even; and
(e) repeating steps (b), (c) and (d) until the cylinder movement difference is equal to zero.

19. A method for positioning a servo head according to claim 18, wherein said method further comprises the step of (f) updating the cylinder movement difference after said detecting in step (c) of one of the odd cylinder crossing and the even cylinder crossing by reducing the cylinder movement difference by 1 if one of the current cylinder and the target cylinder is odd and the other is even.

* * * * *

UNITED STATES PATENT AND TRADEMARK OFFICE
CERTIFICATE OF CORRECTION

PATENT NO. : 5,025,330
DATED : June 18, 1991
INVENTOR(S) : Nishimiya

It is certified that error appears in the above-identified patent and that said Letters Patent is hereby corrected as shown below:

Col. 3, line 6, change "flip-flop" to

--flip-flops--;

Col. 4, line 7, change "flip-flop" to

--flip-flops--;

Col. 4, line 14, change "multiproces"

to --microproces--;

Col. 4, line 15, delete "so as";

Col. 4, line 29, after "cylinder"

insert --(track)--;

UNITED STATES PATENT AND TRADEMARK OFFICE
CERTIFICATE OF CORRECTION

PATENT NO. : 5,025,330
DATED : June 18, 1991
INVENTOR(S) : Nishimiya

It is certified that error appears in the above-identified patent and that said Letters Patent is hereby corrected as shown below:

Col. 4, line 49, change "As another" to --Another--;

Col. 5, line 34, change "purpose, namely, to control of" to --purpose of control, namely, to--;

Col. 5, line 68, change "opo-magnetic" to --opto--.

UNITED STATES PATENT AND TRADEMARK OFFICE
CERTIFICATE OF CORRECTION

| | | |
|---|---|---|
| PATENT NO. : | 5,025,330 | |
| DATED : | June 18, 1991 | |
| INVENTOR(S) : | Nishimiya | |

It is certified that error appears in the above-identified patent and that said Letters Patent is hereby corrected as shown below:

Col. 6, line 57, change "circuit" to --means--;

Col. 8, line 58, delete "circuit";

Col. 9, line 44, after "and" insert --after--;

Col. 11, line 55, change "sets" to --resets--;

Col. 12, line 37, after "speed" (first occurrence only) insert --Vr--, and delete "Vr";

Col. 18, line 8, change "or" to --for--.

Signed and Sealed this

Twelfth Day of January, 1993

Attest:

DOUGLAS B. COMER

*Attesting Officer*   Acting Commissioner of Patents and Trademarks